W. V. TURNER.
AUTOMATIC SPEED CONTROL EQUIPMENT.
APPLICATION FILED JAN. 27, 1917.
1,339,677. Patented May 11, 1920.
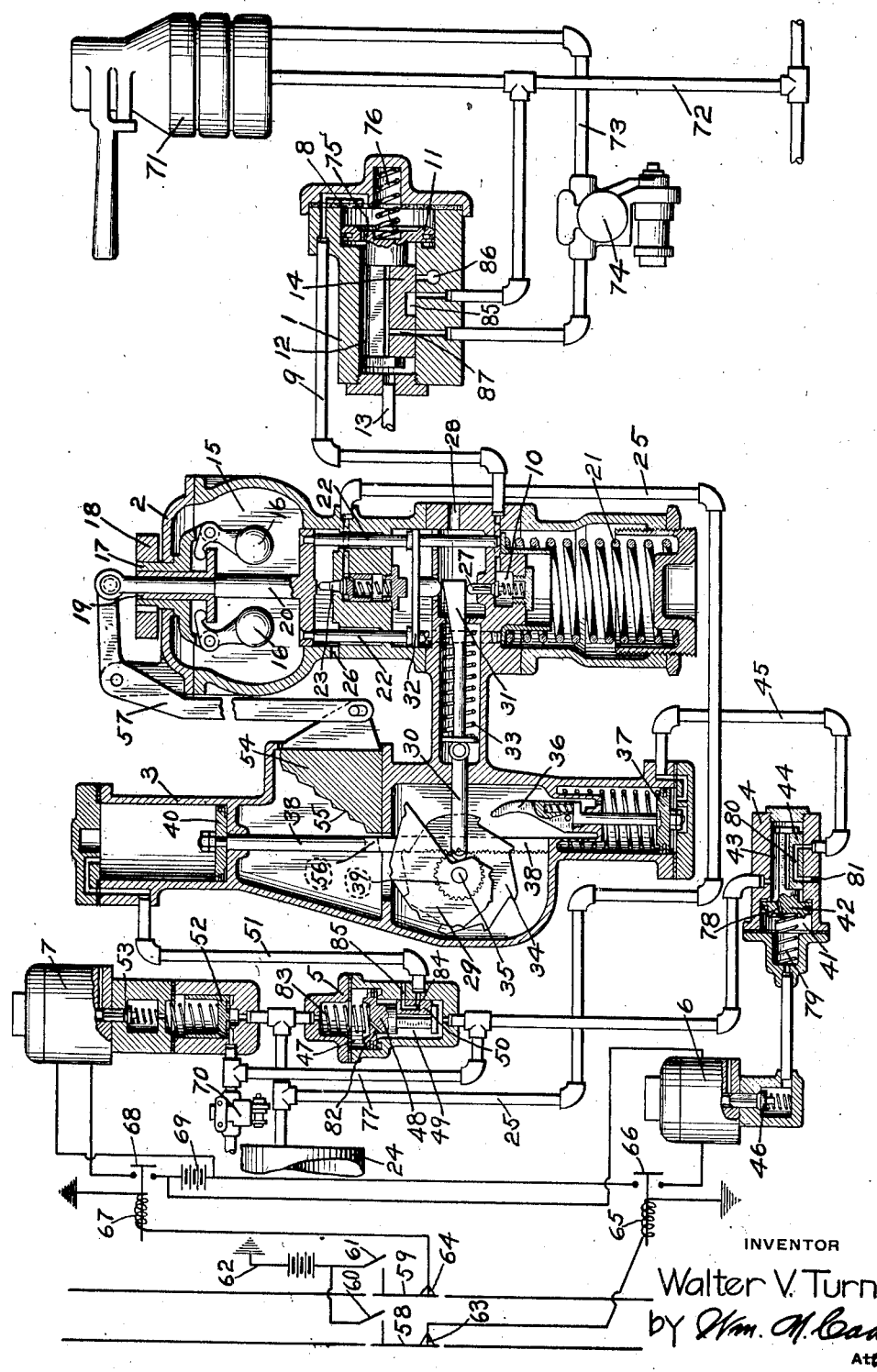
INVENTOR
Walter V. Turner
by *Wm. M. Cady*
Atty.

UNITED STATES PATENT OFFICE.

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

AUTOMATIC SPEED-CONTROL EQUIPMENT.

1,339,677.   Specification of Letters Patent.   Patented May 11, 1920.

Application filed January 27, 1917. Serial No. 145,001.

*To all whom it may concern:*

Be it known that I, WALTER V. TURNER, a citizen of the United States, residing at Wilkinsburg, in the county of Allegheny and State of Pennsylvania, have invented new and useful Improvements in Automatic Speed-Control Equipments, of which the following is a specification.

This invention relates to speed controlling apparatus for railway vehicles, and is more particularly in the nature of an improvement on the construction shown in my prior application, Serial No. 101,029, filed June 1, 1916.

With my prior construction, means are provided for increasing the train speed step by step and for reducing the train speed, according to the traffic conditions, but if the train speed limit is reduced, the mechanism will operate to reduce the speed to the minimum limit. In some cases, it may be entirely safe to only reduce the train speed one step instead of down to the minimum speed limit and one object of my invention is to provide means for accomplishing this purpose.

Another object of my invention is to provide a speed controlled mechanism adapted to effect a predetermined reduction in pressure in the timing reservoir when the train traverses a fixed distance, regardless of the speed of the train.

Other objects and advantages will appear in the following more detailed description of the invention.

In the accompanying drawing, the single figure is a diagrammatic view, partly in section, of a train speed controlling equipment embodying my invention.

In general, the speed control equipment may comprise an application valve device 1 for controlling the application and release of the brakes, a centrifugal governor device 2 for controlling the operation of the application valve device, a governor regulating device 3 for adjusting the governor device 2 so as to operate at different speed limits, a valve device 4 for effecting the operation of the governor regulating device 3 so as to increase the operating speed limit, a valve device 5 for effecting the operation of the governor regulating device so as to decrease the operating speed limit, a magnet valve device 6 governed by a track controlled circuit for controlling the valve device 4, and a magnet valve device 7 governed by a track controlled circuit for controlling the valve device 5.

The application valve device 1 may comprise a casing having a piston chamber 8 connected by pipe 9 to a valve chamber 10 in the governor device 2 and containing a piston 11, and having a valve chamber 12 connected by pipe 13 to a source of fluid pressure, preferably the main reservoir, and containing a slide valve 14.

The centrifugal governor device 2 may comprise a casing having a chamber 15 containing governor balls 16 pivoted to a rotatable sleeve 17 adapted to be rotated by a pinion 18 operatively connected to an axle or other rotating part of the vehicle.

The centrifugal force of the governor balls 16 is exerted on a sleeve 19 mounted on and engaging a shoulder of a plunger 20 and this force is opposed by a spring 21 acting on the plunger 20 through rods 22.

The movement of the plunger 20 is adapted to operate a valve 23 for venting fluid from a timing reservoir 24 through pipe 25 to exhaust port 26, and is also adapted to operate a valve 27 for venting fluid from piston chamber 8 through pipe 9 to an exhaust port 28.

The governor regulating device 3 may comprise a casing having a chamber containing a cam 29 for operating a plunger 30 which is pivotally connected to a wedge block 31 interposed between the valve 27 and a cross bar 32 carried by the rods 22, the plunger 30 being yieldingly pressed against the cam by a spring 33.

For operating the cam 29 in one direction, a ratchet wheel 34 is secured to the shaft 35, carrying the cam, and a pawl 36 is provided for actuating the ratchet wheel, the pawl being operated by a piston 37. The cam 29 is moved in the opposite direction by a rack 38 engaging a pinion 39 carried by the shaft 35 and a piston 40 is provided for operating the rack 38.

The valve device 4 comprises a casing having a piston chamber 41 containing a piston 42 and a valve chamber 43 containing a valve 44 for controlling the admission and release of fluid under pressure through pipe 45 to the piston 37, the fluid pressure on piston 42 being controlled by valve 46 of magnet valve device 6.

The valve device 5 comprises a casing having a piston chamber 47 containing a piston 48 and a valve chamber 49 containing a valve 50 for controlling the admission and release of fluid under pressure through pipe 51 to piston 40.

Fluid pressure on piston 48 is controlled by a relay valve piston 52, the fluid pressure on the valve piston being controlled by valve 53 of the magnet valve device 7.

In order to limit the movement of the rack bar 38 by piston 40 according to the reduction in speed of the vehicle, a laterally movable block 54 is provided having a notched face 55 adapted to engage a projection 56 carried by the rack bar 38. The block 54 is adapted to be operated by a pivotally mounted lever 57 pivotally connected to the plunger 20 and to the block 54.

At desired intervals along the track there are provided short sections of insulated rail 58 and 59 which may be a part of the main track or may be placed adjacent thereto and electrical energy may be supplied to said sections by means of switches 60 and 61 which are connected to a grounded source of current 62 and may be controlled by a signal tower operator or automatically by the movement of trains in adjacent blocks.

On the vehicle are brushes 63 and 64 adapted to respectively engage the sections 58 and 59, the brush 63 being connected to a grounded relay magnet 65 for controlling a switch 66 in the circuit of the magnet valve device 6 and the brush 64 being connected to a grounded relay magnet 67 for controlling a switch 68 in the circuit of magnet valve device 7.

When either the switch 66 or the switch 68 is closed, a common local source of current 69 is connected to the corresponding magnet valve device.

In order to insure more uniform operation, fluid under pressure is preferably supplied through a reducing valve 70 so as to provide a constant operating pressure.

In operation, fluid is supplied from the main reservoir through pipe 13 to valve chamber 12 and normally the brake valve 71 supplies fluid to brake pipe 72 from pipe 73 containing the usual feed valve 74. The supply of fluid from the main reservoir to the feed valve device is controlled by the valve 14 of the application valve device, so that upon operation of the application valve device, fluid will be cut off from the brake valve and thus prevent the supply of fluid to the brake pipe.

Fluid supplied to valve chamber 12 equalizes through a port 75 in piston 11 to piston chamber 8 and the valve 27 being closed, fluid pressures on opposite sides of piston 11 are equalized, permitting spring 76 to maintain the piston in normal release position.

Fluid is supplied from the source of fluid pressure through reducing valve 70 to pipe 77 and thence to valve chambers 43 and 49. From valve chamber 43, fluid equalizes through port 78 in piston 42 to piston chamber 41, and valve 46 being closed, the opposing fluid pressures on piston 42 equalize, permitting spring 79 to maintain the piston in normal release position, in which pipe 45 is connected through cavity 80 with an exhaust port 81.

Piston 48 being shifted to its outer position by fluid pressure in valve chamber 49, fluid equalizes through port 82 into piston chamber 47 and thence into timing reservoir 24, and the fluid pressures on opposite sides of piston 48 equalizing, the spring 83 shifts the piston to release position, in which pipe 51 is connected through cavity 84 with exhaust port 85.

If the signal operator desires to allow an increase in speed of the train, the speed increasing switch 60 is closed so as to energize the rail section 58. When the brush 63 on the train passes over the energized section 58, current is supplied to relay 65, causing the switch 66 to close, so that the magnet valve device 6 is energized and the valve 46 is opened, thereby venting fluid from piston chamber 41. The piston 42 is then shifted, so that valve 44 opens communication for supplying fluid from valve chamber 43 to pipe 45 and thence to piston 37, which is thereupon actuated to shift the pawl 36 into engagement with ratchet wheel 34. The ratchet wheel 34 is thus rotated one notch and causes the rotation of cam 29, so that the plunger 30 is pushed outwardly one step.

In the position shown in the drawing, the wedge block 31 is at its innermost position, where the maximum width of the wedge is interposed between valve 27 and cross bar 32, and it will be evident that a slight movement of the cross bar will be sufficient to open the valve 27. Consequently in this position, when the speed of the train is slightly above the minimum limit, the rotation of the governor balls will produce a sufficient centrifugal force to open the valve 27.

When the wedge block 31 is shifted outwardly one step, as hereinbefore described, the free space between the valve 27 and cross bar 32 is increased and evidently it will require a greater centrifugal force and a greater train speed to move the cross bar 32 so as to effect the opening of valve 27.

If the speed of the train does not exceed the predetermined speed limit for this setting, no action will take place, but if the train speed exceeds this limit, then the valve 27 will be opened, so that fluid is vented from piston chamber 8 of application valve device 1, and piston 11 will then shift valve 14, so as to vent fluid from brake pipe 72 through cavity 85 to exhaust port 86, thus causing the brakes to be automatically applied in the well known manner.

The movement of slide valve 14 also cuts off communication from the main reservoir to pipe 73, so that fluid cannot be supplied through the brake valve 71 to the brake pipe at this time.

When the train speed has reduced to a point below the predetermined speed limit, the valve 27 again closes, permitting equalization of fluid pressures on opposite sides of piston 11 through port 75, so that spring 76 returns the piston 11 to release position, in which the brake pipe vent is closed, and in which fluid is supplied to pipe 73 and thence through the brake valve 71 to the brake pipe, thus automatically effecting the release of the brakes.

If it is desired to permit another step increase in train speed at the succeeding control point, the speed increasing switch 60 at that point is closed, and as previously described, the piston 37 is again operated, so as to cause pawl 36 to shift the ratchet wheel 34 another notch.

The cam 29 is correspondingly rotated and the wedge block 31 is shifted out to another position, in which a greater movement of the cross bar 32 and consequently a greater train speed is required to effect the opening of the valve 27.

In the above manner, the permissible speed of the train may be increased step by step as successive contact sections are passed.

The operation of the valve device 5 for regulating the reduction in speed of the train is governed by the fluid pressure in the timing reservoir 24 and when the pressure in said reservoir has reduced to a predetermined degree, the piston 48 is actuated by fluid in valve chamber 49.

The venting of fluid from the timing reservoir 24 is controlled by valve 23 which is opened a varying amount proportional to the speed of the train, the vent opening being such that in traversing a predetermined distance the pressure in the reservoir will be reduced to the same predetermined degree regardless of the speed of the train.

The predetermined distance in which the required reduction in pressure in the timing reservoir takes place is preferably the distance between the successive contact sections and if the train passes a deënergized contact section 59, the reduction in timing reservoir pressure on piston 48 permits the pressure in valve chamber 49 to shift the piston and cause valve 50 to uncover communication for supplying fluid through pipe 51 to piston 40.

The rack bar 38 is thereby operated to rotate the cam 29 in a direction for permitting the wedge block 31 to move inwardly and thereby decrease the gap between valve 27 and cross bar 32, so that the governor will act to effect an application of the brakes at a reduced speed.

In order, however, to prevent the train speed from reducing to the minimum, which would be the case should the piston 40 make its full stroke, the member 54 acts in accordance with the speed of the train to block the movement by engagement with the projection 56. For example, suppose the train is running at sixty miles per hour and that this rate is the maximum speed limit, then the governor balls will act on lever 57 to throw the block 54 out so that the uppermost notch moves under the projection 56 and the movement of the piston 40 is limited by engagement with said notch. The parts are so adjusted that at this notch the cam 29 is rotated to the fifty mile speed limit position, and thus the brakes will be applied by the opening of valve 27, so that the speed of the train will be reduced to fifty miles per hour. If the succeeding speed reducing contact sections remain deënergized, then the block 54 being moved out by the falling of the governor balls under the reduced speed, the piston 40 and rack 38 can drop down another notch and so on until the minimum speed limit is reached.

If, however, an energized contact section 59 is passed over, the relay magnet 67 will be energized to close switch 68 and thereby effect the energization of magnet device 7. The pilot valve 53 is then opened and fluid is vented from valve piston 52, so that fluid pressure on the opposite side thereof will effect the opening of same and permit the flow of fluid from the main reservoir through the reducing valve 70 to the timing reservoir 24. The reservoir is thereupon recharged with fluid under pressure and the piston 48 is shifted to release position in which valve 50 operates to vent fluid from piston 40. Further movement of piston 40 is thus prevented and consequently the permissible train speed is not changed.

It will now be seen that by means of the above described apparatus, the speed of the train may be controlled within narrow limits and may be gradually reduced as well as gradually increased. If the train circuits fail for any reason, the apparatus works on the side of safety, since the speed of the train is then reduced.

The construction is such that the pressure in the timing reservoir is always reduced to the same predetermined degree when the train has traversed a fixed distance regardless of the speed at which the train may be traveling.

While the spacing of the contact sections may be as desired, they are preferably spaced apart a distance approximating the distance necessary to effect the reduction in speed of the train one step, that is to say, if the difference in rates between successive speed limits is ten miles, then the spacing should be such that the speed of the train will be reduced by ten miles per hour when the train has traversed such distance.

Having now described my invention, what I claim as new and desire to secure by Letters Patent is:

1. In a vehicle speed control equipment, the combination with a speed controlled device for controlling the vehicle, of a mechanism for adjusting said device to act at a reduced speed and means for limiting the action of said mechanism.

2. In a vehicle speed control equipment, the combination with a speed controlled device for controlling the vehicle, of a mechanism for adjusting said device to act at a reduced speed and means operated according to the speed of the vehicle for checking the action of said mechanism.

3. In a vehicle speed control equipment, the combination with a speed controlled device for controlling the speed of the vehicle, of a mechanism for progressively adjusting said device to act at a reduced speed and means for temporarily blocking the progress of said mechanism according to the speed of the vehicle.

4. In a vehicle speed control equipment, the combination with a speed controlled device for controlling the speed of the vehicle, of a mechanism for adjusting said device to act at reduced speeds and means controlled according to the speed of the vehicle for effecting a step-by-step action of said mechanism.

5. In a vehicle speed control equipment, the combination with a device operated according to the speed of the vehicle for varying the speed, of a mechanism for adjusting said device to operate at different speeds and a block operated by said device and having a series of steps adapted for engagement with said mechanism to limit the movement thereof.

6. In a speed control equipment, the combination with a governor operated according to the speed of the train and having a movable stem, of a valve operative by the movement of said stem for controlling the vehicle and a member interposed between said stem and said valve and movable to vary the relative movement of said stem with respect to the valve.

7. In a vehicle speed control equipment, the combination with a governor device controlled according to the speed of the train, of a valve operated by the movement of said governor for controlling the vehicle and a movable wedge interposed between the valve and the governor.

8. In a vehicle speed control equipment, the combination with a governor device controlled according to the speed of the train, of a valve operated upon a relative movement of the governor for controlling the vehicle and a wedge block interposed between the valve and the governor, the movement of which is adapted to vary the relative movement of the governor with respect to the valve.

9. In a vehicle speed control equipment, the combination with means for controlling the train, of a speed governor for operating said means and subject to a force acting in opposition to the force produced by the governor, said force being constant at a given governor speed, a reservoir containing fluid under pressure, and a valve operated by said governor and adapted to vent fluid from the reservoir at a varying rate proportional to the speed of the governor.

In testimony whereof I hereunto set my hand.

WALTER V. TURNER.